F. P. DUNN.
SCALE.
APPLICATION FILED MAR. 13, 1908.
984,891.
Patented Feb. 21, 1911.
3 SHEETS—SHEET 1.
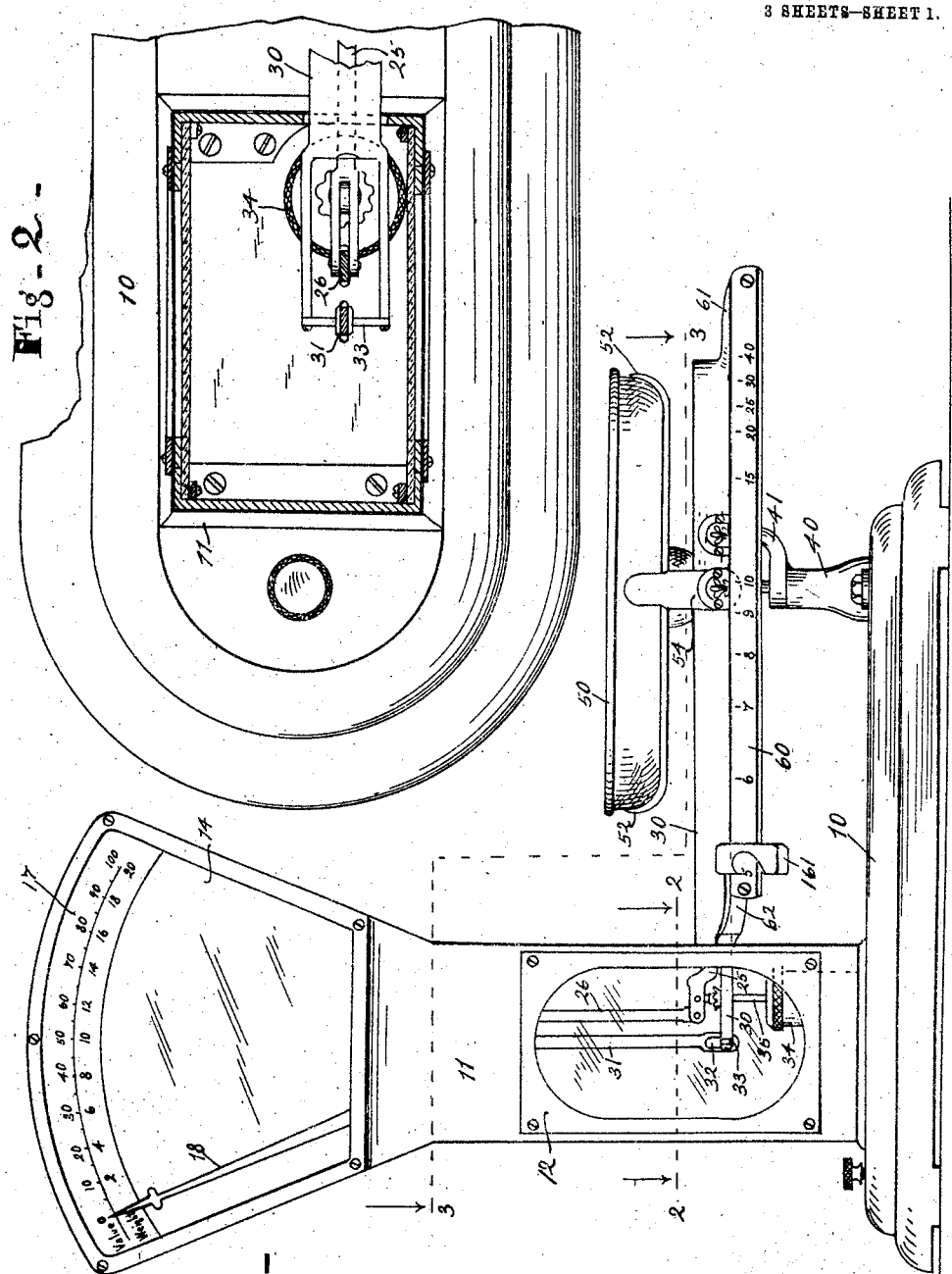
WITNESSES:
J. H. Swan
Olive Breeden
INVENTOR.
Frank P. Dunn
BY
V. H. Lockwood
ATTORNEY.

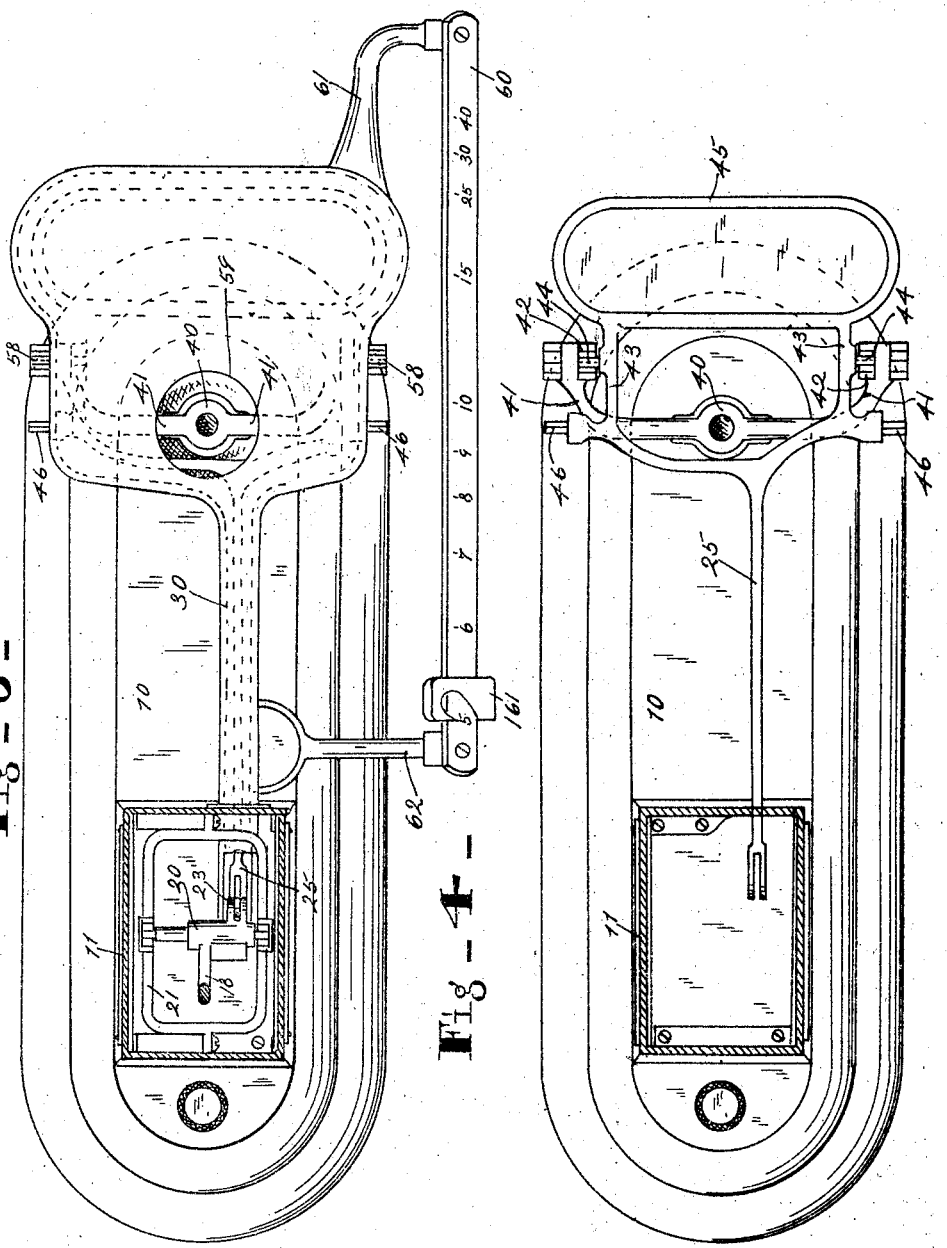

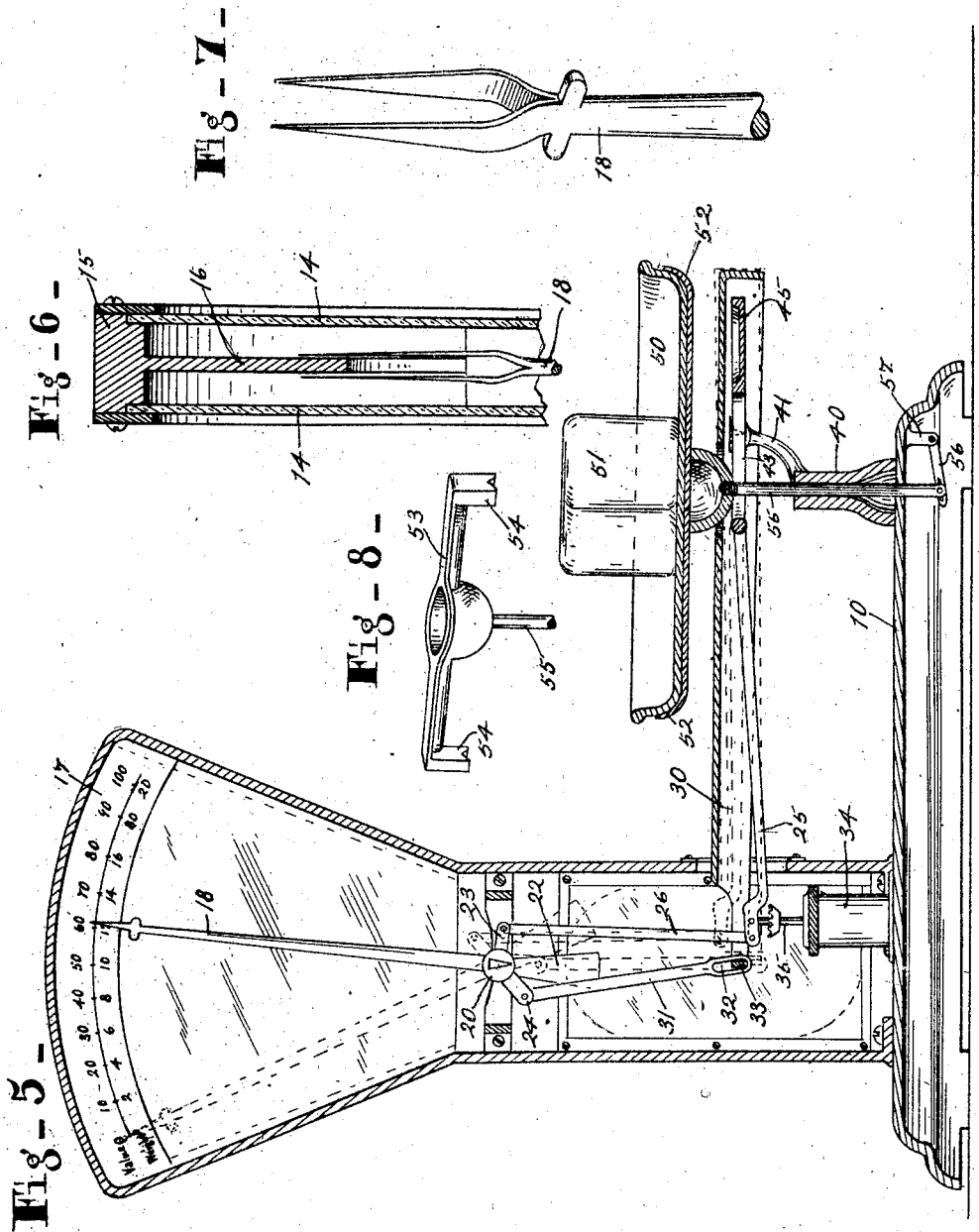

UNITED STATES PATENT OFFICE.

FRANK P. DUNN, OF ANDERSON, INDIANA, ASSIGNOR TO THE ANDERSON TOOL COMPANY, OF ANDERSON, INDIANA.

SCALE.

984,891.

Specification of Letters Patent.

Patented Feb. 21, 1911.

Application filed March 13, 1908. Serial No. 420,850.

*To all whom it may concern:*

Be it known that I, FRANK P. DUNN, of Anderson, county of Marion, and State of Indiana, have invented a certain new and useful Scale; and I do hereby declare that the following is a full, clear, and exact description thereof, reference being had to the accompanying drawings, in which like letters refer to like parts.

The object of this invention is to improve the construction of scales both of the weight and value type, and especially the means for operating the scale and causing it to properly indicate the values of articles as they are weighed, which vary in price-per-pound or other unit.

One feature of the invention consists in providing a horizontal scale beam with prices-per-pound or other unit graduations thereon, and means, such as a poise, movable on said beam for regulating the action of the indicating means and causing it to indicate the total value of any article being weighed at any unit on said scale beam to which the poise or other sliding means might be set. To that end all that is necessary in this scale is to have a single row of total graduations to which the indicator points and which will make the proper value calculations when the poise is moved to the price-per-pound or other unit indicated on the scale beam while the article is being weighed.

In connection with the value indicating means a pound scale can be employed and is here shown so that the scale will indicate the weight of an article when the poise on the price-per-unit scale beam is moved to its normal position. Therefore, with this scale one can immediately determine the weight and also the value of an article or either the weight or value, as desired, and the value and weight numerals to be applied to a single row of graduations, the two sets of numerals being parallel so that the same indicator will point to both series of numerals.

Another feature of the invention consists in the employment of a plurality of levers, each separately and flexibly connected with the indicating means, one of said levers being influenced by the load and transmitting the influence of the load to the indicating means so as to cause or permit the actuation of the indicating means and the other lever is provided with means for variably influencing the indicating means so as to regulate its action. To that end said last mentioned lever, in the form of the invention herein shown, has a price-per-unit scale beam connected with it with a poise on said beam for causing such variable influence on the indicating means. But independently of or in addition to this means for varying the influence, of said indicator controlling lever, the connection between said lever with the indicating means is and may be such as to enable said lever to exert a variable influence upon the indicating means as the same is actuated. In the form herein shown the load-influenced lever is so connected with the indicating means as to actuate it, while the indicator-controlling lever is weighted at its inner end and is provided at such end with a connection leading to the indicating means so as to act in opposition to said load-influenced lever. Thus in the form shown herein the connection between the indicating means and the lever for controlling the indicator normally pulls the support down from the axis of the indicating means when the latter is at zero; but as the indicator is moved from zero, the influence thereon of said indicator-controlling lever is gradually increased by the end of said lever gradually moving away from a vertical line through the axis of the indicating means in a direction opposite to the connection between the indicator and load influenced lever.

While herein there is shown a load-influenced lever with a load-receiving member mounted thereon between the fulcrum of said lever and the end thereof connected with the indicating means, it is not desired to limit the invention to a lever mounted on said principle and which directly actuates the indicating means.

A further feature of the invention consists in mounting the two said levers so that they are substantially parallel with each other and in fact, one extends and operates within the other and they are fulcrumed coaxially, and they move simultaneously and in opposite directions. As herein shown the inner end of the indicator controlling lever moves in the same direction as the load, while the inner end of the load-influenced member moves in an opposite direction, but this relation might be reversed.

The full nature of this invention will be understood from the accompanying drawings and the following description and claims:

In the drawings Figure 1 is a side elevation of the scale with the parts thereof in their idle position. Fig. 2 is a plan view of the left hand part of the base, parts being broken away. Fig. 3 is a horizontal section on the line 3—3 of Fig. 1, showing some of the hidden parts by dotted lines. Fig. 4 is the same as Fig. 3 with the indicating means and the indicator-controlling means removed so as to show the load-influenced lever in plan view. Fig. 5 is a central vertical longitudinal section through the device with the parts in their position when the machine is actuated and the normal position of said parts being indicated by dotted lines. Fig. 6 is a transverse section through the upper part of the device on the line 6—6 of Fig. 5. Fig. 7 is a perspective view of the upper part of the indicator or pointer. Fig. 8 is a perspective view of the bearing for the load-receiving member, the load-guiding rod being partly broken away.

Referring now to the details of the construction of the scale herein shown to illustrate said invention, there is base 10 having an upwardly extending rectangular casing or housing 11 open on its front and rear sides, said openings being closed by removable plates 12, the central portions of which are formed of glass and the outer portions of metal. Through these glass plates the inner ends of the levers and their operation is visible. The upper part of the casing or housing 11 is fan-shaped like the usual fan-shaped scale and it is open likewise on each side, and both sides closed with glass plates 14, see Fig. 6, held in place between the sides of the casing or housing and the center plate 15 from which there is a downwardly extending plate or chart 16 about one inch in width and on each side of this plate or chart there is a lower row of weight numerals, being pounds, and an upper parallel row of total valve numerals, being cents. Between the two rows of numerals there is a single row or series of numerals 17. Both sides of the chart are similarly graduated and marked and the indicator 18 is provided with two points, as shown in Figs. 6 and 7, that move one on each side of the chart or plate 16 and point to the graduations and numerals on each side of said chart, so that both the customer and the merchant face identical charts with the same graduations and the same indicator points to both at the same time. This makes the chart and the reading thereof very simple.

The indicating means, as herein shown, consists of the indicator 18 on a horizontal shaft 20 mounted with suitable knife-edged bearings on a rectangular frame 21 secured about midway of the casing between the top and bottom. A counter-balancing weight 22 extends from said shaft 20 in a direction calculated to counter-balance the indicator 18. An arm 23 extends to the right from said shaft and an arm 24 extends from said shaft in a substantially opposite direction from the arm 23, said arms being arranged to counter-balance each other substantially. Therefore, the entire movable indicating mechanism is constructed so as to be substantially balanced independently of the means for actuating or controlling it.

The indicating means is actuated in the form of scale herein shown by the load-influenced lever 25 through the connecting bar 26 that is pivoted at its lower end to the inner end of said lever 25 and at its upper end to said arm 23. Said indicator is controlled in its movement by an indicator-controlling lever 30, the inner end of which is laterally connected with the connecting bar 31 that at its upper end is pivoted to the arm 24. The arm 24 extends downwardly when the indicator 18 is at zero so that the downward pull on said arm has no appreciable influence on the indicating means when it is at zero, but as the indicator is operated, as shown in Fig. 5, the outer end of the arm 24 gradually moves more and more to the left and thus a variable influence is exercised on said indicator by said lever 30. The connecting bar 31 has a slot 32 at its lower end from which a cross-bar 33 from the lever 30 loosely extends. A dash pot 34 is connected by the stem 35 with the inner end of the load-influenced lever 25.

On the right hand end of the base 10 there is a tubular stand 40 having two fulcrum arms 41 projecting from the upper end thereof somewhat to the right, as seen in Figs. 4 and 5, and each of said arms is provided with a double knife-edged bearing 42, that is, said bearing extends both inwardly and outwardly from said arm as seen in Fig. 4. Upon the inner ends of these bearings 42 the weight-influenced lever 25 is fulcrumed. The right hand end of said lever 25 is divided and yoked to form two lateral arms 43 from which the knife edges 44 project that bear upon the bearings 42. To the extreme right hand end of said arms 43 there is a shallow pan 45 secured in which a small weight or weights may be placed for balancing said lever. From each side of the lever 25, or rather from each arm 43 thereof, there is a laterally extending knife-edge 46, to support the load-receiving member, so that said load-receiving member is supported between the fulcrum points of said lever 25 and the inner end that is connected with the indicating means.

The load-receiving member 50 consists of a removable pan, which, as shown in Fig. 8, has a load or article 51 on it, and the pan support 52 which is centrally mounted on bearing piece 53, shown in Fig. 8. This bearing piece has a central bowl-like portion adapted to receive shot or other weight for balancing the scale and two oppositely extending bearing arms 54 that rest upon the knife edge 46 of the lever 25, and a guide rod 55 extending down centrally from said bearing piece 53 through the hollow stand 40 and the base, and at its lower end is pivotally connected with the bar 56 that is pivoted to downwardly extending arm 57 from the base, as shown in Figs. 5 and 8. This mechanism causes the pan or load-receiving member to always have vertical movement.

The load-influenced lever 25 and the load-receiving member carried thereon are so arranged as to normally be in perfect balance and to enable the same to be readily and accurately balanced the shot-receiving pan 45 and the shot bowl in the bearing piece for the pan or load-receiving member are provided.

The indicator-controlling lever, as herein shown, is a wide hollow frame-like lever open at the bottom with sides and top surrounding or inclosing the load-influenced lever 25, so that in fact said load-influenced lever 25 is mounted and operates with said indicator-controlling lever. The plan view of said indicator-controlling lever is shown in Fig. 3, wherein the right-hand end appears to be a large casing from the sides of which knife edges 58 project and have bearing upon the outer ends of the bearings 42, shown in Fig. 4. There is a hole 59 in said lever 39, as seen in Fig. 3, for the rod 55 and bowl portion of the bearing 53 to extend and operate in. As appears in Figs. 3 and 4, the knife edges 46 from the inner or load-influenced lever project through the sides of the outer or indicator-controlling lever, so that the bearing ends of the bearing piece 53 supports the pan. The load-receiving member may be fulcrumed thereon and operate without any interference on the part of the two levers. This lever, therefore, is in the nature of a cover for the lever 25 and both of said levers are fulcrumed co-axially. That is, the same axial line runs through all their fulcrums. But the indicator-controlling lever 30 is so formed that its inner end is heavier than its outer end and therefore is normally depressed and consequently always exerts a downward pull on the indicating means through the connecting bar 31. But the effect on the indicating means of the downward pull of the weighted end of the lever 30 is variable, by reason of the different positions of the arms 24 extending from the indicating means, as said indicating means is actuated by the load, as has already been explained.

It is observed that with the levers 25 and 30 mounted as described they are in a general sense parallel with each other, but in operation they move in opposite directions. As the load is applied the inner end of the lever 25 moves downwardly and the other end moves upwardly, as shown in Fig. 5.

The mechanism so far described will operate successfully as a weight scale without the addition hereafter to be described, and by providing said scale with a computing or value chart, as is common in the art heretofore, said scale will operate as a value or computing scale. A horizontal scale beam 60 is secured to two arms 61 and 62 extending out from the indicator-controlling lever 30. Said scale beam is graduated with price-per-pound marks and numerals and has a poise 161 slidable thereon. The spaces between the graduation marks diminish from left to right or inversely with the price-per-pound numerals which increase from left to right.

As stated before, the indicator-controlling lever 30 is weighted on its inner end so as to properly coöperate with the other parts so as to regulate the indicator. It is obvious that when the poise 161 is at 5 on the scale beam 60, that is to the left of the fulcrum of the lever 30, the weight of the inner end of said lever will be correspondingly greater than when the poise is moved to the right to the other numerals. The effect of the weight of the poise on the inner end of the lever 30 and on the indicating means diminishes as it is moved to the right; and it is noted that the scale beam 60 extends to the right beyond the fulcrum of the lever 30 but the inner end of the lever 30 is weighted sufficiently that when the poise 61 is moved to its limit to the right it will fail to counterbalance the weighted end of the lever 30, so that said end of the lever 30 is at all times weighted or over-balanced but the overweight of the inner end of the lever 30 is rendered variable by the sliding poise 161.

The weight scale on the chart is graduated so the scale will indicate the weight properly with the poise 161 at its left hand limit and normal position, that is, indicating five cents per pound. In other words, the weight scale on the chart is arranged with reference to articles selling at five cents per pound and it may be arranged with reference to articles to be sold at some other price per pound by changing the graduations. The total-value numerals on the chart are merely a multiplication of the weight numerals by the price-per-pound indicated by the poise 161 at its normal position, as shown in Fig. 1. That is, the weight numerals are multiplied by 5 to make the total value numerals, although some other price-per-unit may be employed as a base for calculating the numerals on the chart.

In operation the scale may be used as a weight scale or a value scale. When used as a weight scale the poise 161 is left at the five cent mark, as shown in Fig. 1. When used as a value scale the poise is moved to the price at which the article being weighed is sold. When the poise is moved away from the five cent mark then the indicator does not truly indicate the weight but does truly indicate the value. Therefore the operator can readily determine both the weight value of the article first, by placing the poise at the five cent mark and reading the weight and then moving the poise to the price-per-pound and then reading the total value. Or he can operate the scale to indicate either weight or value, if desired.

A great practical advantage in this scale is the location of the price-per-unit scale beam in a convenient horizontal position in front of the operator and where scale beams and poises are usually located, that is, near the load-receiving pan or member, which is the most convenient and satisfactory place for locating such scale beam. Another advantage is that it enables the scale to be used with only one row of total value numerals instead of a very complicated chart which has heretofore been used in fan-shaped scales. Likewise, the arrangement is very convenient for indicating the same readings of the chart to both the operator and the purchaser, one being the reverse of the other and the chart being very simple and not calculated to confuse a purchaser or rendered difficult for any purchaser to understand and read at once. By the flexible connection between the levers and the indicating means I mount herein any connection that is not rigid, whether it be a pivotal connection, as herein shown or a connection of the flexible means rigidly connected or pivotally connected at its ends. But while I have shown herein a stationary chart of weight and value graduations with a movable indicating means, certain features of this invention are not necessarily limited to such relative arrangement of said parts.

What I claim as my invention and desire to secure by Letters Patent is:

1. A scale including indicating means, a total value chart, therefor, a load influenced lever, a price lever independent of and substantially parallel with said load influenced lever and graduated with prices per unit of weight, connections between said levers and the indicating means whereby one lever will tend to actuate the indicator and the other to oppose such actuation, and a poise readily slidable on the price lever.

2. A scale including indicating means, a total value chart therefor, a load influenced lever connected with the indicating means for causing the movement thereof when the load is applied, a price lever independent of said load influenced lever and graduated with different prices per unit of weight, a pivotal connection between the price lever and the indicating means, and a poise readily slidable on the price lever whereby the price lever will regulate the movement of the indicating means with reference to said chart according to the different prices per unit of the article being weighed.

3. A scale including indicating means, a load influenced lever connected with the indicating means for causing the movement of said indicating means when a load is applied, a price lever horizontally disposed and connected with said indicating means for regulating the movement thereof and provided with graduations, and means along said price lever for varying its action on said indicating means.

4. A scale including indicating means, a load influenced lever connected with the indicating means for causing the movement of said indicating means when a load is applied, an independent price lever provided with price-per-unit graduations, a connection between said price lever and the indicating means so as to cause said price lever to oppose the action of said load influenced lever on said indicating means, and a slidable poise on said price lever.

5. A scale including means provided with value graduations and an indicator, one of said parts being movable relatively to the other, a horizontal load influenced lever, and a horizontally disposed indicator-controlling lever mounted beside the load influenced lever and both connected with said movable part so as to oppose each other's influence thereon.

6. A scale including indicating means, a plurality of independent horizontally disposed levers connected with said indicating means so as to cause a variable movement thereof, and means adjustable according to the price-per-unit of the load for modifying the action of said levers on the indicating means.

7. A scale including indicating means, a plurality of levers beside each other and connected therewith so as to oppose each other's influence thereon, a load receiving member on one of said levers, and means for varying the influence of the other lever upon said indicating means.

8. A scale including indicating means, a plurality of parallel levers connected therewith so as to oppose each other's action thereon, a load receiving member mounted on one of said levers, and means for varying the influence of the other lever on said indicating means and having price-per-unit graduations for setting said varying means.

9. A scale including indicating means, a load-influenced lever connected therewith, and an indicator-controlling lever connected with the indicating means, said levers being fulcrumed co-axially.

10. A scale including an indicating means, a load-influenced lever connected therewith, a horizontal indicator-controlling lever parallel with said load influenced lever and provided with a weighted end, and a connection between the weighted end of said indicator-controlling lever and said indicating means that variably opposes the influence on said indicating means of the load-influenced lever.

11. A scale including an indicating means, a load-influenced lever connected therewith, a horizontal indicator-controlling lever parallel with said load influenced lever and provided with a weighted end, a connection between the weighted end of said indicator-controlling lever and said indicating means that variably opposes the influence on said indicating means of the load-influenced lever, and a chart with weight graduations along which said indicator moves.

12. A scale including an indicating means, a load-influenced lever connected therewith for causing the actuation thereof, and an indicator-controlling lever connected with said indicating means so as to exert a variable influence on said indicating means, said levers being substantially parallel with each other.

13. A scale including indicating means, a plurality of levers mounted beside each other, an independent connection between said levers and the indicating means, a load receiving member on one of said levers, and means for varying the influence of the other lever upon said indicating means.

14. A scale including an indicating means, a load-influenced lever connected therewith for causing the actuation thereof, and an indicator-controlling lever connected with said indicating means so as to exert a variable influence on said indicating means, said levers being substantially parallel with each other and one lever extending and operating within the other.

15. A scale including an indicating means, a load-influenced lever connected therewith for causing the actuation thereof, and an indicator-controlling lever parallel with the load influenced lever and connected with said indicating means so as to partially resist the action of the load-influenced lever on the indicating means and to exert a variable influence thereon whereby under the influence of a load said levers will move in opposite directions.

16. A scale including an oscillatory indicating means, a load-influenced lever, a connection between one end of said lever and the indicating means at one side of its axis, a load-receiving member on said lever between its fulcrum and its connection with the indicating means, a horizontal indicator-controlling lever with a weighted end, and a connection between the weighted end of said lever and said indicating means at a point substantially opposite to the connection therewith of said load-influenced lever and so arranged that normally said indicator-controlling lever exerts a downward radial pull on the indicating means.

17. A scale including an indicating means, a load-influenced lever flexibly connected therewith, and an indicator-controlling lever flexibly connected therewith so as to oppose the action of the load-influenced lever and weighted on its inner end, said levers being fulcrumed co-axially, and a load-receiving member mounted on said load-influenced lever between its fulcrum and its connection with the indicating means.

18. A scale including an indicating means, a load-influenced lever flexibly connected therewith, an indicator-controlling lever mounted beside said load influenced lever and flexibly connected therewith so as to oppose the action of the load-influenced lever and weighted on its inner end, a load-receiving member mounted on said load-influenced lever between its fulcrum and its connection with the indicating means, and means for varying the influence of said indicator-controlling lever upon said indicating means.

19. A scale including indicating means, a load-influenced lever connected therewith, an indicator-controlling lever connected therewith, a load-receiving member mounted on said load-influenced member between its fulcrum and its connection with the indicating means, a price-per-unit scale beam connected with said indicator-controlling lever, and a poise slidable on said scale beam.

20. A scale including indicating means, a chart along which said indicator moves having a row of weight graduations and a corresponding row of total value graduations calculated at a certain price-per-unit, a load-influenced lever connected with said indicating means, an indicator-controlling lever connected therewith and weighted, a scale beam connected with said weighted indicator-controlling lever having price-per-unit graduations, and a poise thereon which at one point on said scale beam causes the indicator to show the weight of the load as well as the value at such price per unit and the effect of which poise on said indicator-controlling lever diminishes as it is moved along the scale beam to higher prices-per-unit.

In witness whereof, I have hereunto affixed my signature in the presence of the witnesses herein named.

FRANK P. DUNN.

Witnesses:
  OLIVE BREEDEN,
  J. H. SWAN.